Dec. 23, 1941.                N. B. WALDO                    2,267,061
                              DUST COLLECTOR
                          Filed July 22, 1940          2 Sheets-Sheet 1

Neill B. Waldo, INVENTOR

BY *Victor J. Evans & Co.*

ATTORNEYS

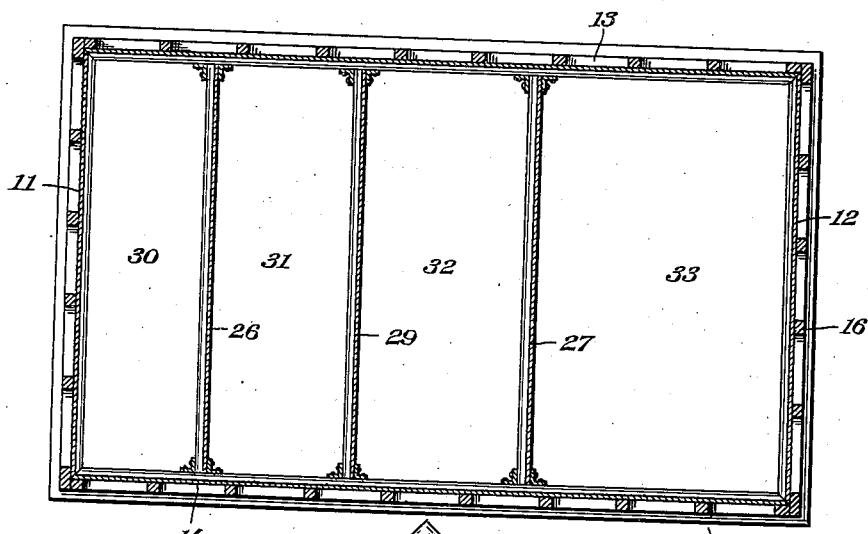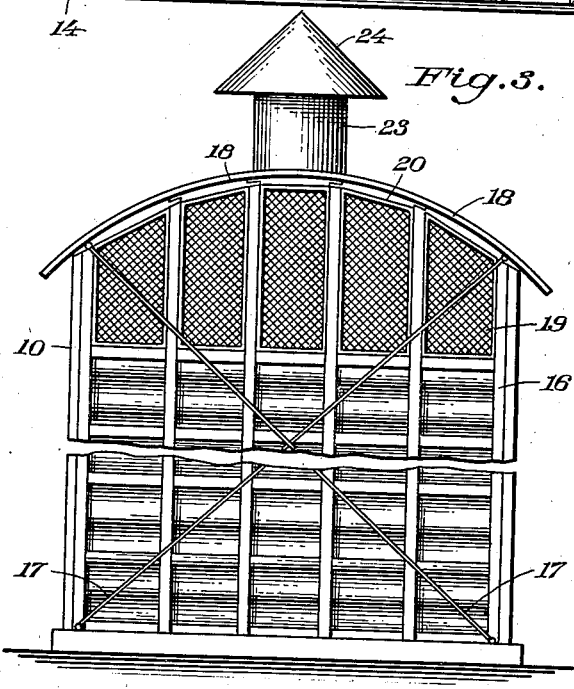

Patented Dec. 23, 1941

2,267,061

UNITED STATES PATENT OFFICE 2,267,061

DUST COLLECTOR

Neill B. Waldo, El Reno, Okla.

Application July 22, 1940, Serial No. 346,864

4 Claims. (Cl. 183—106)

My invention relates to milling machinery such as is used in connection with the manufacture of poultry feeds and the like, and has among its objects and advantages the provision of an improved dust collector.

In the manufacture of poultry feeds, alfalfa crops, as an example, are reduced to a finely ground condition and the grinding process is accompanied with an objectionable dust condition and considerable waste of material in the form of dust which passes to the atmosphere. The dust which passes to the atmosphere is made up of such finely divided particles as to be carried away easily and escape collection through the medium of dust collectors employed in the trade. A further objection incident to escape of large quantities of dust to the atmosphere resides in the fact that the dust floats to considerable distances about the surrounding neighborhood and dwellings and other property become dust laden. Such dust is valuable as a poultry feed ingredient and the escaped dust provides an ideal ingredient in poultry feed concentrates as well as a coloring agent for poultry feeds.

Accordingly, an object of my invention is to provide a dust collector which may be employed in conjunction with conventional milling machinery and in which the collector is so devised as to collect the greater part of the fine dust particles which heretofore have passed to the atmosphere. More specifically, I provide a dust collector in the nature of a shed or building of considerable size.

The building is provided with a series of partitions upstanding from the floor and depending from the roof. The dust is delivered to the building through the roof thereof, and the partitions upstanding from the floor terminate short of the building roof and the partitions depending from the roof terminate short of the floor. The depending partitions are alternately positioned between the upstanding partitions and the building is provided with an air outlet in its roof but at the end opposite the dust and air inlet. All the partitions are so arranged as to provide a continuous and tortuous passage for the air and dust, and the partitions are so spaced as to increase the size of the passage as the air and dust moves toward the outlet. Thus the building or dust collector is of enormous size with respect to the dust and air inlet and the air and dust passage inside the collector is so fashioned that the air and dust is relatively free from motion so as to enable the dust to more effectively settle.

The lower part of the building constitutes a settling chamber for the dust, and the partitions are provided with horizontal corrugations which more effectively collect the dust. Much of the collected dust will adhere to the corrugated partitions and when the accumulations become sufficiently great, the dust will fall to the floor. The corrugated partitions, in connection with the dust laden air which is relatively free from motion, perform an efficient dust collecting function. The building, while embodying the necessary structural strength for the purpose intended, is provided with a series of wall areas or panels which may be ruptured or blown from their mountings in the event of a dust explosion so as to afford protection against destruction of the building as a whole.

In the accompanying drawings:

Figure 2 is a sectional view along the line 2—2 of Figure 1; and

Figure 3 is an elevational view of one end of the building, with the building illustrated fragmentarily, showing the manner in which the frame structure of the building may be reinforced against sagging or yielding.

Figure 1:
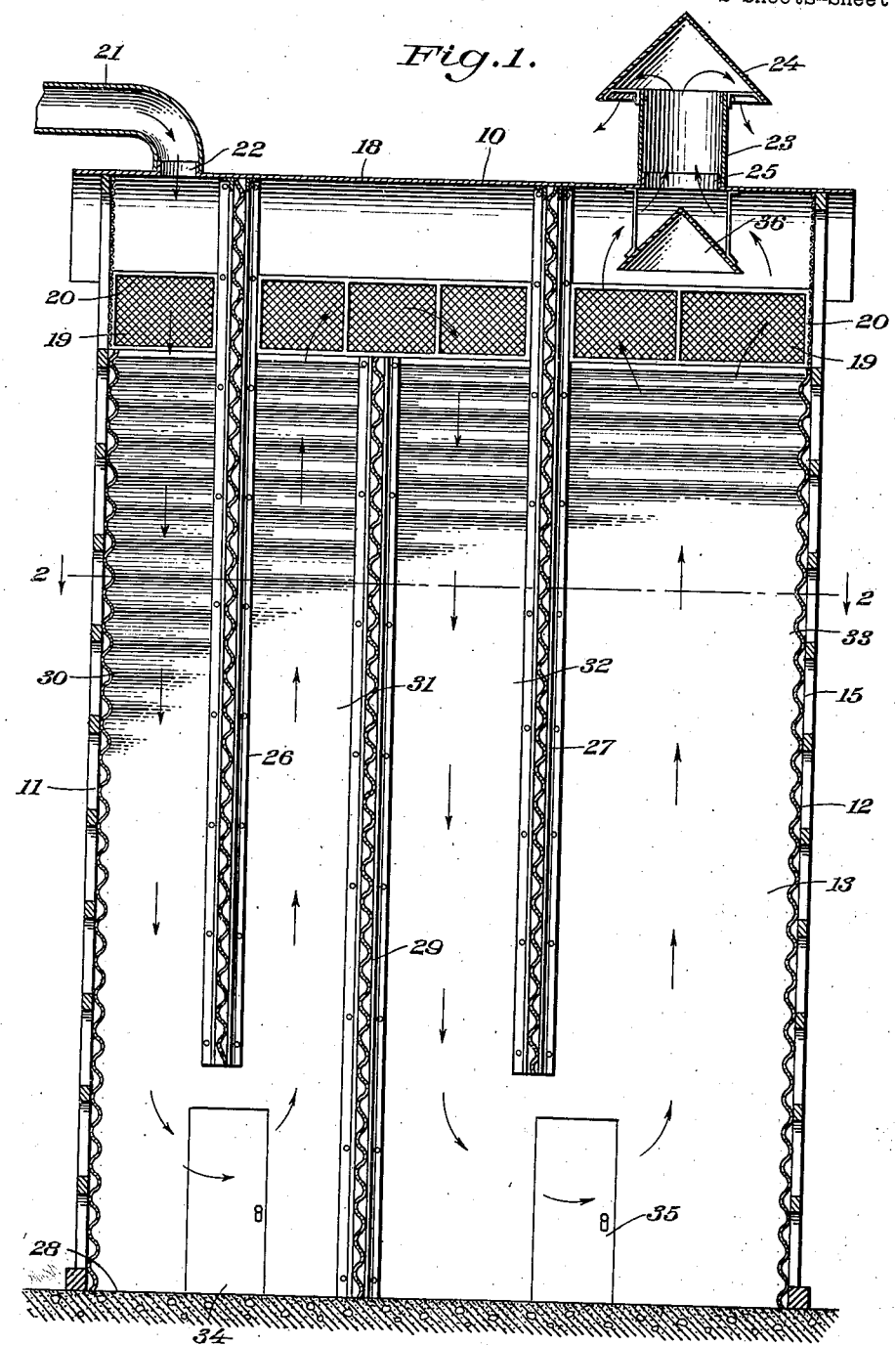
Figure 1 is a vertical sectional view of a dust collector in accordance with my invention.

In the embodiment selected to illustrate my invention, the dust collector comprises a building structure 10 in which the four walls 11, 12, 13 and 14 are constructed of corrugated sheet iron 15, with the corrugations extending horizontally. In accordance with Figs. 2 and 3, the sheet iron 15 is positioned inside supporting frames 16, and the frames are supported against sagging or misalignment through the medium of crossed tie members 17, as in Fig. 3. The sheet iron 15 may be nailed directly to the frames 16, and the sheet iron 15 terminates short of the roof 18 to provide accommodation for panels 19 which may comprise suitable fabric supported in frames 20. Frames 20, while being securely fastened against accidental displacement, may be removably attached to the frames 16 in such manner as to tear loose easily in the event of a dust explosion so as to afford protection for the building structure in general. One means of securing the frames 20 may comprise small nails which adequately support the frames against accidental removal under normal operating conditions.

According to Fig. 2, an inlet pipe 21 is secured to a neck 22 fashioned on the roof 18, which pipe has communication with the milling machinery (not shown). As a rule, the air and dust escaping from the milling machinery escape through a screen or filter known in the trade as a "cyclone cleaner." Roof 18 is provided with a relatively large pipe 23 covered by a canopy 24 and attached to a neck 25 fashioned on the roof. Pipe 23 constitutes an outlet for air blown into the building 10, and the canopy 24 provides a shield against the entrance of moisture such as rain.

To the side walls 13 and 14 of the building structure and its roof 18 are secured two partitions 26 and 27, which partitions have their lower ends spaced ten or eleven feet above the floor line 28. A third partition 29 is secured to the side walls of the building and rests on the floor thereof, but the upper end of the partition 29 terminates short of the roof 18. Thus air entering the building structure passes downwardly of the passage branch 30, about the lower end of the partition 26 and upwardly in the passage branch 31. The air then moves across the upper end of the partition 29 and downwardly in the passage branch 32 after which the air passes underneath the lower end of the partition 27 and then flows upwardly in the branch passage 33 which has communication with the outlet pipe 23.

Passage branches 30, 31, 32 and 33 extend the full width of the building structure, but the partitions 26, 29 and 27 are spaced progressively farther apart when viewed from left to right in Fig. 1. Partition 26 is spaced closer to the wall 11 than it is to the partition 29, and the partition 27 is spaced farther from the wall 12 than from the partition 29. It will thus be seen that the passage branches 30, 31, 32 and 33 are of progressively larger cross-sectional proportions when viewed from left to right and that the smallest passage constitutes the inlet chamber for the dust laden air.

Notwithstanding the fact that conventional systems employ dust cleaners, a large amount of dust finds its way to the atmosphere. Large areas surrounding a mill become covered with the fine dust. Then, too, dust heretofore passed to the atmosphere has an important value as an ingredient in concentrates. In the present case, the dust laden air enters the building 10 and is caused to circulate in a tortuous path as well as to progressively lessen its velocity to the end that the air becomes relatively free from motion. Thus the dust is given a chance to settle and collect on the exposed wall and partition surfaces in the building. The horizontal corrugations increase the dust collecting properties of the exposed surfaces and the building is of such proportions with respect to the volume of dust laden air entering therein as to provide ample room for dust settling to the bottom of the building and to provide a passage which renders the air substantially free from motion.

Fig. 1 illustrates the wall 13 as being provided with doors 34 and 35 which permits removal of dust collecting in the building. Fig. 1 illustrates a deflector 36 supported from the roof 18 and located coaxially with the tube 23. Deflector 36 tends to deflect the outgoing air in a more circuitous path.

Having thus described certain embodiments of my invention in detail, it is, of course, understood that I do not desire to limit the scope thereof to the exact details set forth except insofar as those details may be defined in the appended claims.

I claim:

1. A dust collector of the type described comprising a housing having an inlet and an outlet, vertically extending partitions in the housing arranged to coact with the walls thereof to provide a tortuous air passage between the inlet and the outlet, said partitions being so spaced with respect to one another and some of the walls of the housing as to provide a progressively increasing volumetric capacity in the direction of said outlet, said partitions and said walls being provided with horizontal dust collecting corrugations extending transversely of the direction of air flow through the passage.

2. A dust collector of the type described comprising a building having an air inlet and an air outlet in the roof structure thereof, partitions depending from the roof structure and a partition extending upwardly from the floor of the building, said partitions being spaced one from the other and with respect to said walls of the building to provide a tortuous air passage having a progressively increasing volumetric capacity in the direction of said outlet, the walls of the building and said partitions being formed of corrugated sheet material, and said corrugations extending horizontally.

3. A dust collector of the type described comprising an enclosure having an inlet and an outlet for dust laden air, said enclosure being provided with vertically extending partitions relatively spaced and arranged to provide a tortuous passage extending between said inlet and said outlet, said passage progressively increasing in volumetric capacity from the inlet to the outlet, and said partitions being provided with dust collecting corrugations extending transversely of the direction of air flow through said passage.

4. A dust collector of the type described comprising a housing having an inlet and an outlet for dust laden air, vertically extending partitions in said housing arranged to provide a tortuous air passage between the inlet and the outlet, and horizontal dust collecting corrugations formed in the partitions and the walls of the housing and extending transversely of the direction of air flow through the passage, with the bottom part of the housing comprising a settling chamber for dust.

NEILL B. WALDO.